United States Patent [19]

Haney

[11] Patent Number: 4,603,503
[45] Date of Patent: Aug. 5, 1986

[54] PORTABLE BAIT CONTAINER

[76] Inventor: James P. Haney, 340 Park Dr., Canonsburg, Pa. 15317

[21] Appl. No.: 775,813

[22] Filed: Sep. 13, 1985

[51] Int. Cl.⁴ ............................................. A01K 97/04
[52] U.S. Cl. .......................................................... 43/56
[58] Field of Search ...................................... 43/56, 55

[56] References Cited

U.S. PATENT DOCUMENTS

| | | | |
|---|---|---|---|
| 336,967 | 3/1886 | Ward | 43/56 |
| 354,958 | 12/1886 | Weightman | 43/56 |
| 1,943,815 | 11/1933 | Parrott | 43/56 |
| 2,259,814 | 10/1941 | Green | 43/56 |
| 2,711,610 | 6/1955 | Miller | 43/56 |
| 2,849,144 | 8/1958 | Southwell | 43/56 |
| 3,751,845 | 8/1973 | Van Leeuwen | 43/56 |

*Primary Examiner*—Gene P. Crosby

[57] ABSTRACT

A light-weight, longitudinally extending, bottle-like fishing bait container for live minnows and the like has a body of transparent or see-through wall construction with a neck at one end thereof on which a lid is removably mounted for cleaning-out purposes. The body of the container is adapted to be carried in an endwise-suspended relation on the clothing belt of a fisherman by a flexible connector chain or the like of a clamping assembly, and also to be pulled behind a boat in a lengthwise floating and partially submerged relation. The connector chain is secured to the ring of a centrally positioned mounting boss or post on the lid. The lid has a central bait inserting and removing open portion in a bottom segment thereof, and a side group of water and air circulating holes therein in a balanced, side-positioned relation with respect to said open portion. A closure member of substantial quadrant shape is, at its inner end, swingably pivoted by a stem extending backwardly from the mounting boss substantially centrally of the lid. Importantly, the closure member is weighted to cooperate with the end assembly in always retaining a bottom half of the body in a substantially longitudinally aligned, submerged relation with respect to the surface of a body of water.

14 Claims, 6 Drawing Figures

U.S. Patent  Aug. 5, 1986  4,603,503
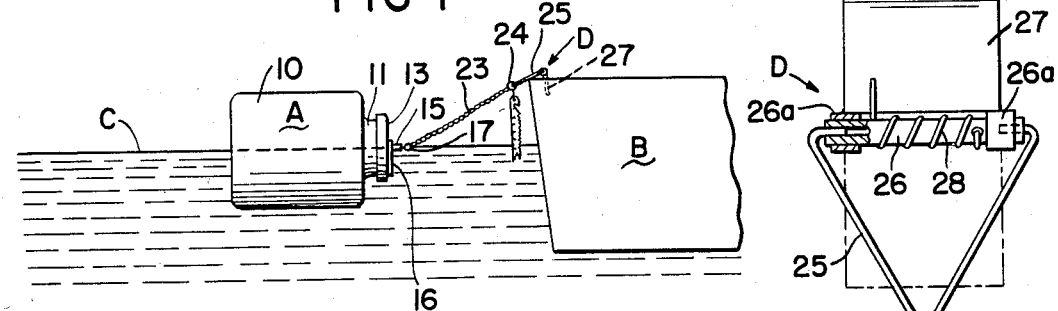
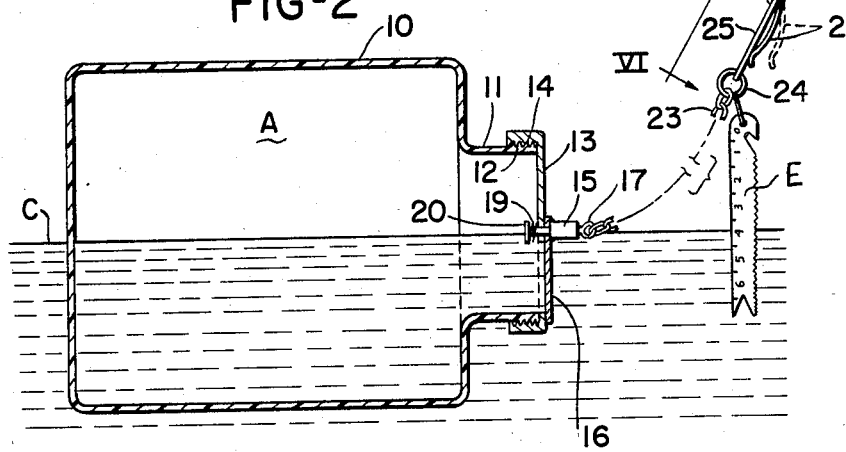
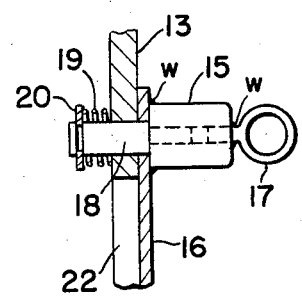
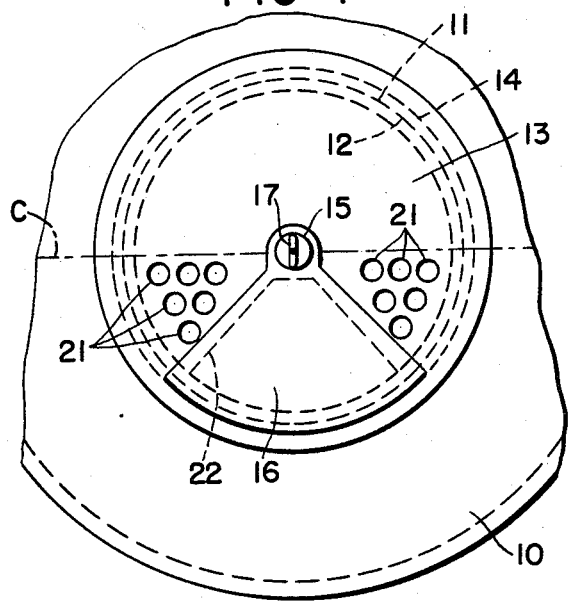
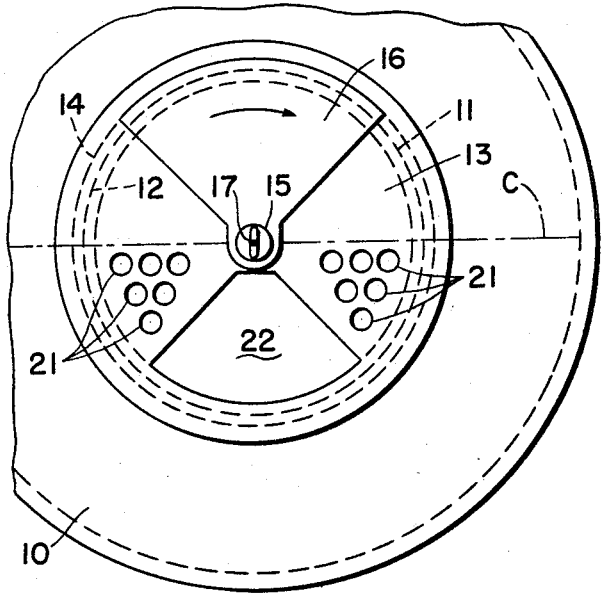

PORTABLE BAIT CONTAINER

This invention relates to an improved container for live bait which can be suspended in an upright position from the clothing of a fisherman while he is walking to and from a body of water and which thereat, can be attached to a boat and maintained or pulled in a lengthwise horizontal position through the water in a partially filled floating relation.

As a fisherman, I have been cognizant of the need for a bait container which will be inexpensive to produce and substantially fool-proof in its utilization and which can be easily carried by a fisherman, free of his hands.

It has thus been an object of the invention to provide a light-weight, practical form of container that will facilitate the handling, carrying and usage of live bait, such as minnows and the like.

Another object has been to provide a container that will, at all times, give the fisherman a visual knowledge of its content suitable live bait.

A further object has been to devise a bait container that will always float in the water in a desired position, that will provide air-water circulation when it is being drawn by a boat as well as when it is in a quiescent condition as attached thereto.

A still further object has been to provide a container that is substantially transparent as well as light in weight, that will always maintain a correct floating position in the water, and that may be suspended from the belt of the user as well as from the gunwale of a boat.

These and other objects of the invention will appear to those skilled in the art from the specification, drawings and claims.

In the drawings:

FIG. 1 is a reduced, somewhat diagrammatic side view in elevation of a portable container and attendant equipment of my invention, as suspended from a boat;

FIG. 2 is an enlarged side view, partially in vertical section, showing details of the construction of the container of the invention;

FIG. 3 is a further enlarged, fragmental vertical sectional detail of mounting elements for a swing closure part of the container;

FIG. 4 is a further enlarged, fragmental front end view in elevation of the container of FIG. 2, looking from its front end; it particularly illustrates its air-water circulating holes and its swinging, weighted closure member in a closed position with respect to a bait inserting and removing opening in a lid of the construction;

FIG. 5 is a view similar to FIG. 4 and on the same scale showing the weighted closure member in an upwardly open position; and, FIG. 6 is an enlarged fragmental end view in partial section showing a representative mounting or suspending means in the form of a spring-pressed clamping assembly for removably mounting the container in an endwise suspended relation, for example, from the clothing belt of a fisherman.

Referring particularly to FIGS. 1 and 2, a lightweight, substantially transparent, bottle-like container body A of cylindrical shape, preferrably of plastic material, is shown provided at its front end with a reduced cylindrical neck portion 11 having male threads 12 thereabout. An end closure cap or lid has internal or female threads 13 to cooperate with the male threading 12 for removably securing it in position on the neck portion 11. A planar front face of the lid 13 which may be of plastic or metal material, is shown provided iwth two, side-positioned, triangular groups of water and air circulating holes 21 therein that are located below the water level C when the container A is floated, as contemplated, in a partially, half-longitudinally submerged position.

As indicated in the figures, the container A will be substantially half-filled with water when in its lengthwise floating relationship; thus it has an air space therein, both when it is being lengthwise floated and when it is being carried in an endwise suspended relation from the belt of a fisherman. The bottom half or segment of the lid 13 is shown provided with a centrally disposed bait inserting and removing open portion 22 therein of substantially triangular shape. It will be noted that the two groups of holes 21 and the opening 22 represent substantially the lower, submerged half of the cap or lid 13. The open portion 22, as particularly indicated in FIG. 5, is located in a central relation intermediate the two side groups of holes 21 and is of a sufficient size to pour live bait onto the hand of the fisherman or, in other words, to remove bait from the container A without the need for unscrewing capping lid 13.

As shown particularly in FIGS. 2 and 3, a planar, disk-like, somewhat triangular or substantially quadrant-shaped closure member 16 has a backwardly extending stem 18 and a forwardly extending boss or post 15 secured thereto, as by weld metal w. A tension spring 19 is adapted to be positioned in a compressed relation between the back side of the lid 13 and a split ring or washer 20 that is mounted in a circular groove in the stem 18. Mounting post or boss 15 has a chain-receiving ring pin 17 secured centrally therein by weld metal w.

In accordance with this construction, the boss 15 may be pulled outwardly to, in turn, pull the closure member 16 outwardly against the force exerted by the tension spring 19 to facilitate turning it between its upper open and its lower closing-off positions of FIGS. 4 and 5. The member 16 has a slide positioning with respect to the closure lid 13 and, importantly, has a weighted construction, such as of heavy metal. The weighted construction is such that when the closure 16 is in its normal closed position of FIG. 4 and the container A is placed in the water, it will automatically cause the container A to turn and seek the aligned position of FIGS. 2 and 4 and to maintain such a position when it is being floated behind a boat B or is being pulled from a fisherman's belt.

Referring particularly to FIGS. 2 and 6, a flexible connector chain, wire or cable 23 is shown attached to the ring 17 at its one end, and to a second connector ring 24 at its other end. As shown, if desired, a fish tool, such as a combined fish length measure, scaler and bottle opener E may be suspended from the loop of the ring 24. It may also be used as an anchor to let the container float off the bank of a lake or stream. A converging end of a triangular-shaped, wire-like shank 25 of a spring clip D is also shown connected to the ring 24. The triangular shank 25 is at its upper ends, bent-in to fit within end bores in a cylindrical, cross-extending shaft 26. A torsion spring 28 is carried on the shaft 26 and its one end projects in a secure relation into a mounting hole on the shaft 26. The other end of the spring 28 projects, as shown in FIG. 6, into abutment with a clamping tab or plate 27 to normally, as shown in FIG.

2, force the tab into tight abutment with the shank 25. The dot-dash line of FIG. 6 illustrates the clamping position of the plate 27, while the solid line of this figure represents its fully sprung-out position. The dash line of FIG. 2 represents a lesser sprung-out position when the plate 27 is, for example, clamped on the clothing belt of a fisherman. A more open stance of the clamping plate 27 may be employed when the spring clip D is to be mounted on the edge or gunwale of a boat B, for example. Any suitable mounting or attaching means may, however, be employed.

As to the container A, any suitable clear or substantially transparent thermosetting or thermoplastic plastic, such as polystyrene, or a polyvinyl may be used. As to the closure member 16, a weighted, relatively rust-resistant or a coating protected metal, such as iron or steel may be used and, in this connection, an aluminum alloy which has weighted characteristics has also been found to be practical.

I claim:

1. A portable bait container that is floatable on its side within a body of water which comprises, an elongated floatable body for carrying live bait in water therein, said body having an open end portion, a lid mounted on said open end portion, said lid having water and air circulating hole portions and a bait inserting and removing open portion in a balanced relation in a lower half portion thereof, a closure member carried by said lid for opening and closing movement with respect to said open portion, and said lid being weighted when said closure member is in a closed position with respect to said open position to align the lower half portion of said body in a substantially longitudinally floatable relation within the body of water.

2. A bait container as defined in claim 1 wherein said closure member provides the weighting for said lid and is mounted in a substantially aligned relation between said circulating hole portions when it is in a closing-off position with respect to said open portion of said lid.

3. A bait container as defined in claim 2 wherein, a stem rotatably mounts said closure member on a front face of said lid for opening and closing movement with respect to said open portion, a mounting means is provided, and flexible suspension means is connected at one end to said stem and at its other end to said mounting means, whereby said body may be carried in an endwise upright relation by attaching said mounting to clothing of a fisherman.

4. A bait container as defined in claim 2 wherein, said body is of transparent plastic material, said closure member is substantially a quadrant in shape to close-off said open portion without obstructing said circulating hole portions, said closure member has a converging inner end portion, and means pivotally secures said inner end portion substantially centrally of said lid for movement over its front face into and out of opening and closing positions with respect to said open portion of said lid.

5. A portable bait container floatable on its side within a body of water which comprises, an enlongated floatable body for carrying live bait in water therein, said body having an open neck portion at a front end thereof, a lid mounted over said neck portion, said lid having water-air circulating hole portions in a balanced relation and a bait inserting and removing open portion in a lower half portion thereof, said bait inserting and removing open portion having an intermediate position between said hole portions, a swingable closure member of weighted construction carried by said lid for movement into and out of a secure closing-off position over said open portion, and said closure member when in its closing-off position being adapted to align the lower half portion of said body with the water level when said body is floated longitudinally in the body of water.

6. A bait container as defined in claim 5 wherein, said hole portions are of an equally balanced side-positioned relationship with respect to said open portion, and said hole portions and said open portion represent substantially a bottom half of said lid that is adapted to rest below the water level when said body is floated in the body of water.

7. A bait container as defined in claim 5 wherein means is located substantially centrally of a longitudinal axis of said body for rotatively mounting said closure member on said lid.

8. A bait container as defined in claim 7 wherein tension means is associated with said mounting means for securely retaining said closure member in its closed position with respect to said open portion.

9. A bait container as defined in claim 7 wherein, said mounting means has an outwardly extending ring, a chain is secured at one end to said ring, and a clamp is secured to an opposite end of said chain for clamping on a clothing belt of a fisherman to enable carrying said body in an endwise suspended position by a fisherman.

10. A bait container as defined in claim 9 wherein, said chain has a connecting ring at its opposite end to which said clamp is swingably carried by said connecting ring, and a fish measuring and scaling tool is also swingably carried by said connecting ring.

11. A bait container as defined in claim 5 wherein, said lid is threadably mounted on said open neck portion, and spring-tensioned post means pivotally centrally mounts said closure member on said lid to rotatably swing thereabout between secure open and closed positions with respect to said open portion.

12. A bait container as defined in claim 11 wherein, a flexible connector is mounted at one end on said post means, a clamping means is connected to an opposite end of said connector and has means for removably mounting said connector in a suspended relation from clothing of a fisherman in such a manner that said container may be carried in an endwise suspended relation by the fisherman.

13. A bait container as defined in claim 5 wherein, said body is of substantially transparent material, so that its bait content may be quickly determined by a fisherman, said body and its said neck portion are of substantially cylindrical shape, said closure member is of substantially quadrant shape and has a mounting stem extending through and mounting it on said lid, a tension spring is mounted on an inner end of said stem in abutment with said lid for securely retaining said closure member in a desired tension-held position with respect to said lid, and a mounting and hand-gripping and suspension post is secured on said closure member to project outwardly in an aligned relation with respect to said stem for rotating said closure member on said lid.

14. A bait container as defined in claim 13 wherein, a clamping means is provided, and a flexible connecting means is connected between said clamping means and said post for suspending said body endwise from the front end thereof.

* * * * *